United States Patent
Kohler (10) Patent No.: US 6,192,396 B1
(45) Date of Patent: Feb. 20, 2001

(54) ELECTRONIC MAIL WITH RECIPIENT-SPECIFIC CONTENT

(75) Inventor: Timothy L. Kohler, San Jose, CA (US)

(73) Assignee: Canon Kabushiki Kaisha, Tokyo (JP)

(*) Notice: Under 35 U.S.C. 154(b), the term of this patent shall be extended for 0 days.

(21) Appl. No.: 09/132,463

(22) Filed: Aug. 11, 1998

(51) Int. Cl.[7] .................................................. G06F 15/16
(52) U.S. Cl. ............................... 709/206; 707/9; 707/5; 707/10; 713/200
(58) Field of Search .............................. 709/206; 707/9, 707/5, 10, 100, 103, 102, 6; 345/327; 705/7; 713/200

(56) References Cited

U.S. PATENT DOCUMENTS

| | | | |
|---|---|---|---|
| 5,247,661 * | 9/1993 | Hager et al. | 707/9 |
| 5,265,033 | 11/1993 | Vajk et al. | 709/206 |
| 5,535,323 | 7/1996 | Miller et al. | 345/338 |
| 5,627,764 | 5/1997 | Schutzman et al. | 709/207 |
| 5,632,011 | 5/1997 | Landfield et al. | 709/206 |
| 5,636,340 | 6/1997 | Bonneau et al. | 707/500 |
| 6,044,376 * | 3/2000 | Kurtzman, II | 707/102 |
| 6,115,709 * | 9/2000 | Gilmour et al. | 707/9 |

* cited by examiner

Primary Examiner—Dung C. Dinh
Assistant Examiner—Chuong Ho
(74) Attorney, Agent, or Firm—Fitzpatrick, Cella, Harper & Scinto (57) ABSTRACT

A computerized messaging system which authors messages that contain recipient-specific content, such that each recipient does not necessarily receive a message that is identical to all other recipients. To author a computerized message that contains recipient-specific content, plural portions of the message are authored, and one or more recipients to which at least one portion of the message will be sent are identified. For each recipient, at least one portion of the message is associated with the recipient, such that at least one recipient does not receive all portions of the message. Viewing options are provided to the sender so as to enable the sender to obtain visual cues as to which portions of the message are sent to each recipient or set of recipients, or to allow the sender to view a recipient list for selected portions of the message. At the receiving side, a recipient can view a received message with visual cues such that recipients of private portions of a message can know that others did not receive the private portion, and can further know who received which portions.

52 Claims, 10 Drawing Sheets

ELECTRONIC MAIL WITH RECIPIENT-SPECIFIC CONTENT

BACKGROUND OF THE INVENTION

1. Field of the Invention

The present invention relates to an authoring system for computerized messages such as electronic mail, and specifically to an authoring system for computerized messages that can create messages containing recipient-specific content such that all recipients do not receive the identical version of the message.

2. Description of the Related Art

Current computerized messaging systems provide for the ability to send a computerized message to more than one recipient. Such systems are limited, however, in that each recipient receives the identical message. This is inconvenient, for example, in a situation where it is desired to send a private comment to some but not all of the recipients.

For example, in an electronic mail ("E-mail") messaging system, the sender authors a text message, with or without attachments, that can be sent to recipients in any of three categories: a "To:" category, a "cc:" category, and a "bcc:" category. As is known, the "To:" category is for the directly-intended recipient or recipients, the "cc:" category is for courtesy-copy recipients who are included for information, and the "bcc:" category is for blind-courtesy-copy recipients who are intended to receive the message without other recipients being aware of their receipt. However, even with the above addressing categories, what is received by each recipient is the entire text of the message and all attachments. Thus, each recipient receives the identical message.

In some situations, the sender wishes to forward some portions of a message only to certain recipients and not to others. For example, a sender may desire to include private comments in the E-mail message, with the private comments being readable only by bcc recipients. However, since current E-mail systems send the identical message to each and every recipient, it is necessary for the sender to create two different E-mail messages, and to select which message is to be sent to which recipient. This arrangement is cumbersome and time-consuming, and inevitably leads to errors.

SUMMARY OF THE INVENTION

It is an object of the invention to address the foregoing difficulties in conventional computerized messaging systems by providing an authoring system for computerized messages, such as electronic mail, that contains recipient-specific content.

In one aspect, the invention provides for a sender of computerized messages such as E-mail to select portions of the message or attachments which are sent only to certain recipients. In one embodiment, authoring of an E-mail message in which selected portions of the text or attachments are sent only to certain recipients involves the steps of first creating a message and creating a list of recipients. If no contrary instructions are entered, the entire message will be sent to all recipients. After the author has created the list of recipients, any portion or portions of the message which are to be sent only to certain recipients are selected, such as with a pointing device or with key strokes. A list of available recipients is provided to the sender for selection, such as with a "pop-up" menu. The recipients for the selected text are then selected (or selected ones can be deselected, if desired). Any other portions to be sent only to some recipients are also selected in the same way, and the respective lists of recipients for those portions are designated, resulting in a message in which one or more portions are not sent to all recipients.

As an alternative approach, the author can identify which portions of the message are for which recipients in a different manner. At the beginning of the message, the author can select or list the intended recipient(s) for the initial portion of the message, and then compose that portion. The author then selects which recipients are to receive the following portion, and then composes that following portion. This procedure is continued until the message is complete.

Thus, according to this aspect of the invention, authoring a computerized message that contains recipient-specific content involves composing plural portions of the message, identifying one or more recipients to which at least one portion of the message will be sent, and for each recipient associating at least one portion of the message such that at least one recipient does not receive all portions of the message. This associating may comprise selection of portions and identifying recipients of selected portions, and identification may be by either selection or deselection from the list of recipients. Thereafter, the message may be sent with each recipient receiving only its designated portion or portions of the message.

Other aspects of the invention involve the provision of a pleasing and efficient visual interface between the authoring system and the sender. For example, recipients for the selected portions of the message may appear colored, underlined or otherwise highlighted when the portions of the message that are received by such recipients has received focus by the sender. The portions of the message itself may also appear colored, underlined or otherwise highlighted, even when not in focus, so as to indicate that the highlighted portion has a limited list of recipients. Color coding or some other form of differential highlighting (such as multiple underlining) may also be employed so as to show which different portions of a message are sent to different sets of recipients.

In further aspects, the invention allows the sender to view the respective portions that are actually sent to each recipient. Viewing may be by color coding or differential highlighting as described above. Alternatively, the portions can be viewed in an "as-received" mode such that the sender can view the message as it will be received by each recipient. Thus, the invention allows the sender to view the message with visual cues of the portions that are sent to each recipient.

Conversely, rather than viewing the message, the sender can view recipients, such as by viewing a list of recipients for each selected portion of a message. This aspect of the invention provides the sender with the ability to modify the list of recipients for each portion, and to make such modifications easily.

At the receiving end of the message, a recipient can view received messages with portions highlighted or a recipient list displayed, so that the recipient of private portions of the message can know that one or more others did not receive that portion, and can further know which recipients actually received the private portion.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
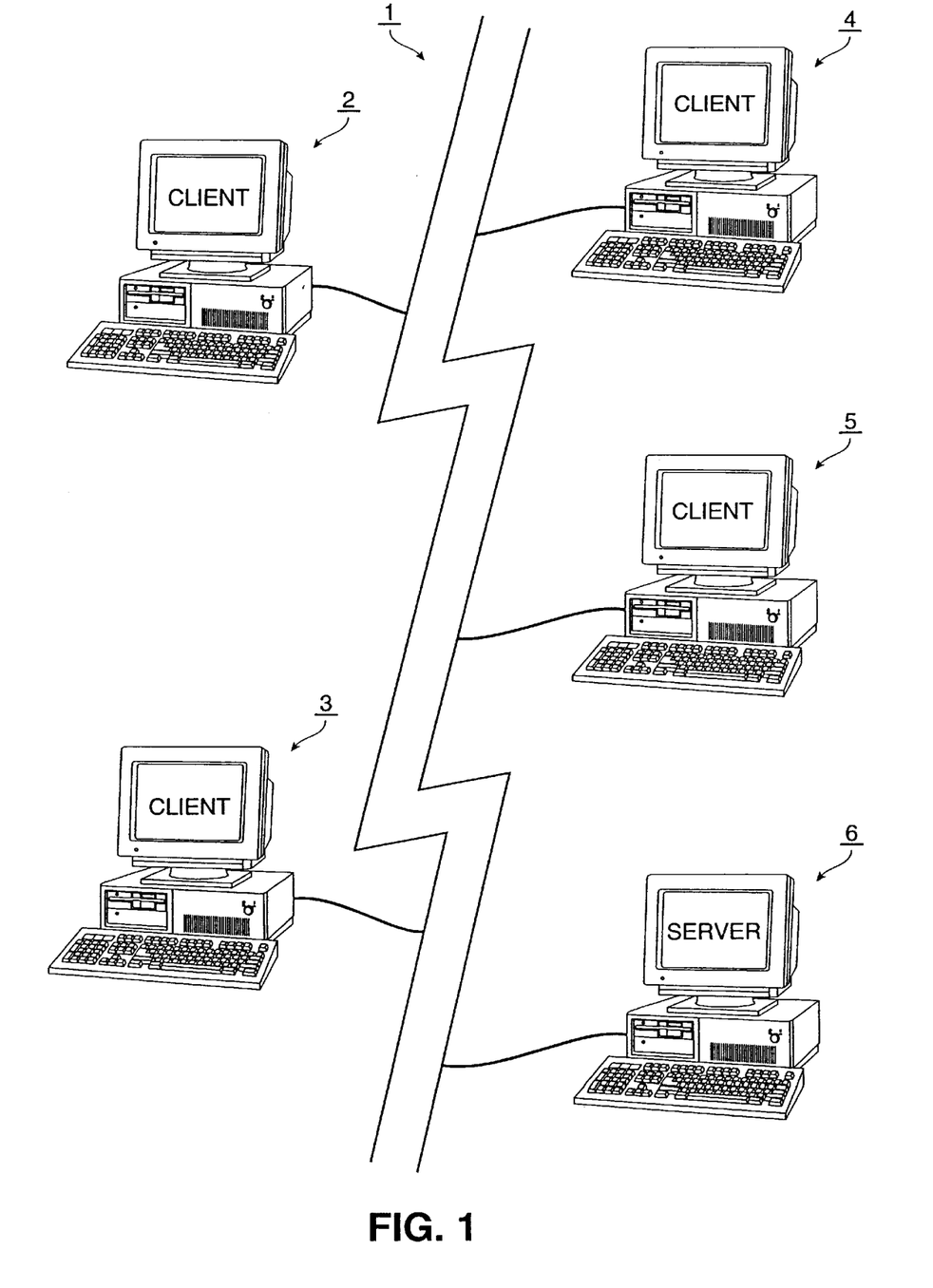
FIG. 1 is a representational view of a computerized messaging system in which the present invention may be utilized.

FIG. 1 is a representational view of computerized messaging system 1, in this case an electronic mail system, in which the present invention can be utilized. Computer systems 2 through 6 are connected to each other through network 7. Computer systems 2 through 5 are E-mail clients, and computer system 6 is an E-mail server. Computer systems 2 through 6 can comprise programmable general-purpose computers or other types of data processing equipment. Network 7 can comprise a local area network (LAN) such as an Etherneto network, a wide area network (WAN) such as a pair of LANs connected over a phone line via routers, a commercial E-mail network, the Internet, an intranet, or any other network that accommodates computer messaging services such as E-mail.

In operation, a user generates an E-mail message using one of the E-mail clients, for example, E-mail client 2. The user then sends the E-mail message to recipients who have access to the E-mail clients of computerized messaging system 1. When the user sends the E-mail message, the message is communicated to E-mail server 6. Typically, E-mail server 6 maintains a shared directory with subdirectories corresponding respectively to each of the users who have access to computerized messaging system 1. A copy of the message is stored in the subdirectories corresponding to the intended recipients.

Whenever a user is logged-on to one of E-mail clients 2 through 5, that E-mail client periodically polls E-mail server 6 to see if any unread messages have been stored in the subdirectory corresponding to that user. In the example described above, if the user is an intended recipient of the E-mail message, the server notifies the client that a new unread message has been placed in that user's subdirectory on the server. Then, the user can read the message using the E-mail client to which the user is logged-on, and the user can store the message for later reference. After the message is read by the user, the message typically is deleted from that user's subdirectory on E-mail server 6 so as to free-up space on the server.

It should be noted that the invention also is applicable to E-mail systems that differ from computerized messaging system 1 described above. For example, in other E-mail systems, a single computer system can serve as both an E-mail client and an E-mail server. The invention is applicable to E-mail systems that have any number of E-mail clients and E-mail servers, and that are interconnected through any number of networks. The invention also is applicable to other types of computerized messaging systems, such as instant message systems (e.g., WinPop®), chat rooms, and the like.

Figure 2:
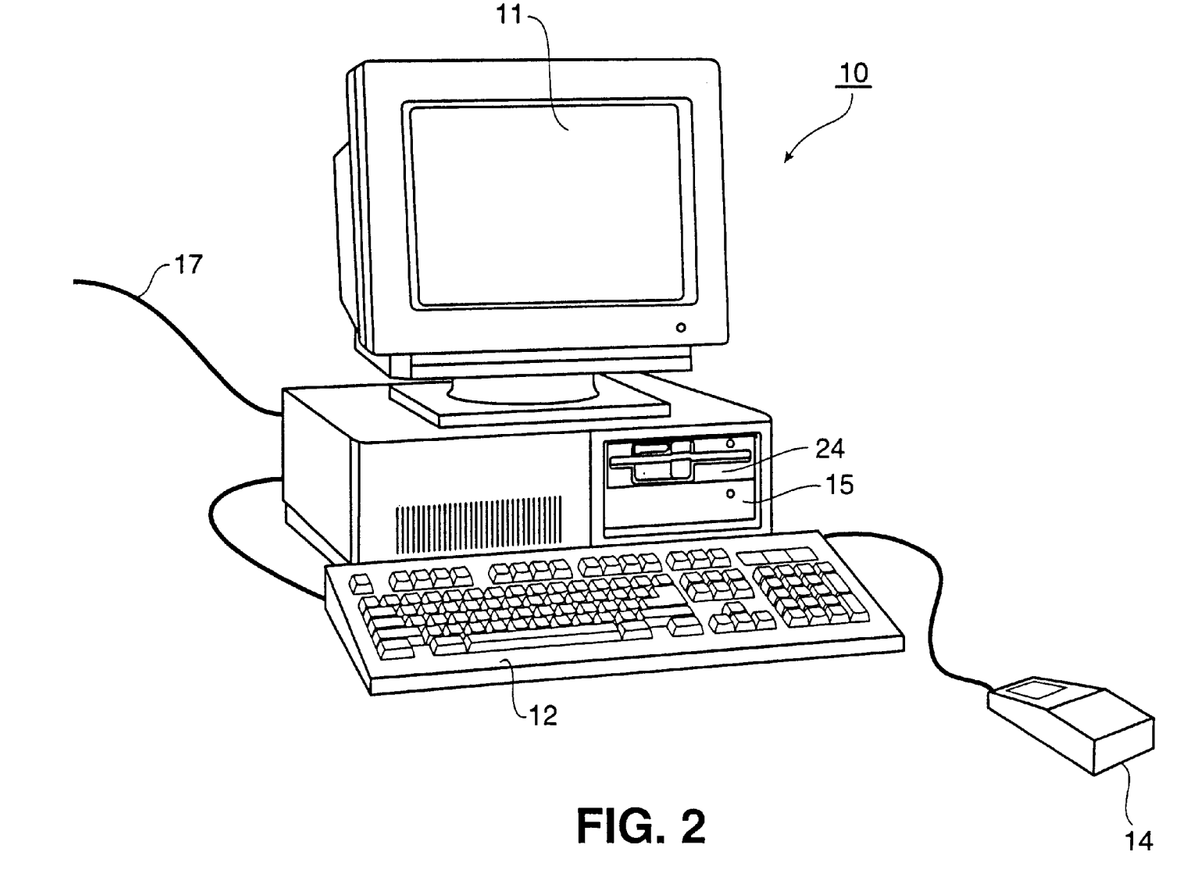
FIG. 2 is a representational view of a computer system that can serve as an E-mail client or an E-mail server for use with the present invention.

FIG. 2 is a representational view of a computer system 10 that can serve as an E-mail client or an E-mail server for use with the present invention. Computer system 10 may be a Macintosh®, PC-compatible, or other type of system having an operating system which preferably is a windowing operating system, such as Microsoft® Windows, but which may also be a non-windowing system, such as DOS or UNIX. In the preferred embodiment, computer system 10 is a Pentium®-based computer system.

Provided with computer system 10 are display 11, which may be a color monitor, keyboard 12 for entering user commands, and pointing device 14 such as a mouse for pointing to and for manipulating graphical user interfaces and other objects displayed on display 11. Computer system 10 also includes a mass storage device such as fixed disk 15 for storing computer-executable process steps for E-mail applications, E-mail files, other applications, other files, and the like. Such storage may also be provided by a CD-ROM (not shown).

Network interface 17 provides an interface between computer system 10 and network 7, as described with respect to FIG. 1 above. Thus, network interface 17 provides computer system 10 with access to computerized messaging system 1.

Figure 3:
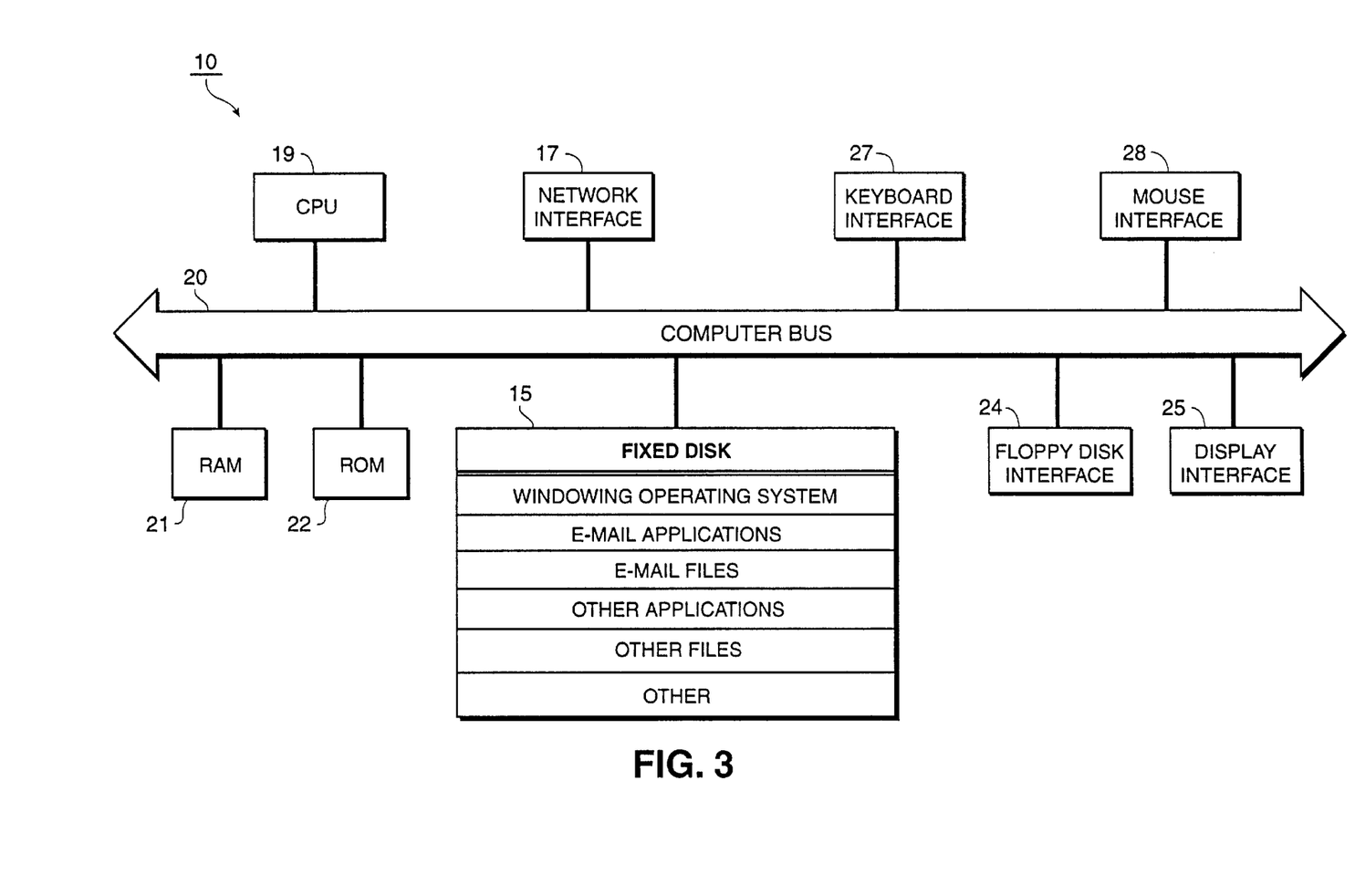
FIG. 3 is a detailed block diagram showing the internal architecture of the computer system shown in FIG. 2.

FIG. 3 is a detailed block diagram showing the internal architecture of computer system 10. As shown in FIG. 3, computer system 10 includes central processing unit (CPU) 19, which interfaces with computer bus 20. Also interfacing with computer bus 20 are fixed disk 15, network interface 17, main memory (RAM) 21, read-only memory (ROM) 22, floppy disk interface 24, display interface 25 to display 11, keyboard interface 27 to keyboard 12, and mouse interface 28 to pointing device 14. Other components, such as a printer, scanner, modem or the like, also can be interfaced to computer bus 20.

Main memory 21 interfaces with computer bus 20 so as to provide RAM storage to CPU 19 during execution of software applications. More specifically, CPU 19 loads process steps from fixed disk 15, another storage device, or some other source such as network 7, into main memory 21. CPU 19 then executes the stored process steps from main memory 21 in order to execute applications. Data such as E-mail messages can be stored in fixed disk 15, main memory 21, or at some other location in network 7, where the data can be accessed by CPU 19 during execution of the process steps.

As also shown in FIG. 3, fixed disk 15 typically contains an operating system, E-mail applications, E-mail files, other applications, other files, and the like.

Figure 4:
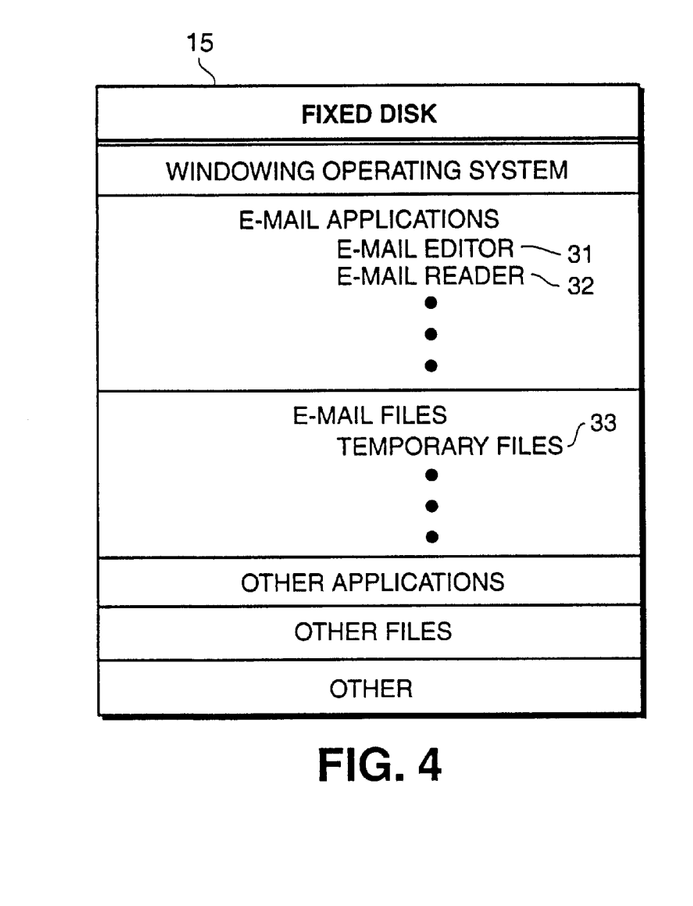
FIG. 4 is a representational view showing E-mail applications and E-mail files stored in a fixed disk of a computer system that serves as an E-mail client.
Figure 5:
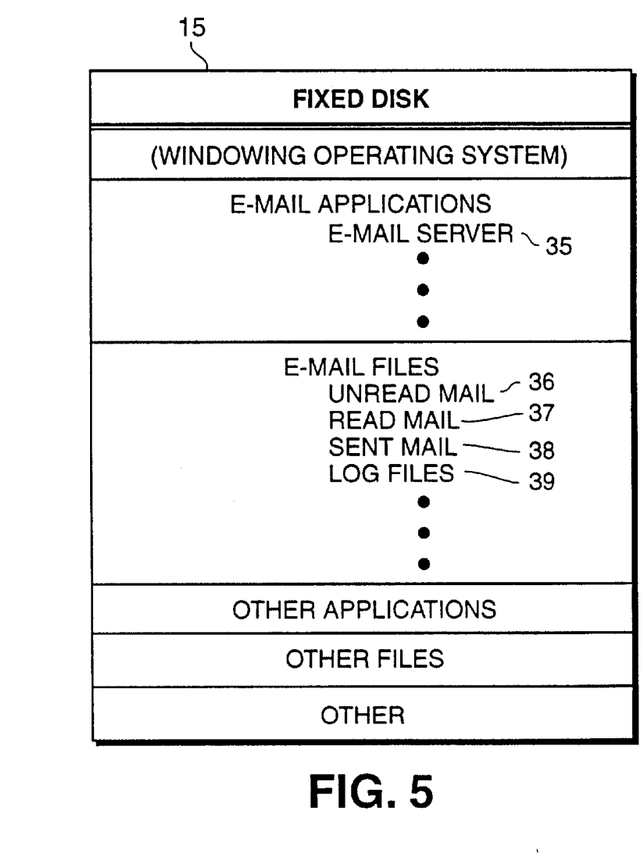
FIG. 5 is a representational view showing E-mail applications and E-mail files stored in a fixed disk of a computer system that serves as an E-mail server.

In the preferred embodiment, the E-mail applications and E-mail files stored on fixed disk 15 differ depending on whether computer system 10 is serving as an E-mail client or as an E-mail server. FIGS. 4 and 5 illustrate the E-mail applications and E-mail files stored in fixed disk 15 in these two cases.

FIG. 4 is a representational view showing E-mail applications and E-mail files stored in fixed disk 15 in a case where computer system 10 is serving as an E-mail client. As shown in FIG. 4, the E-mail applications stored in fixed disk 15 include E-mail editor 31 and E-mail reader 32. E-mail editor 31 is used for generating, editing, and sending E-mail messages to one or more recipient(s) who can access computerized messaging system 1. E-mail reader 32 is used for reading E-mail messages sent to a user logged-on to computer system 10. In the E-mail client context, fixed disk 15 also stores E-mail files including temporary files generated by E-mail editor 31 and by E-mail reader 32.

FIG. 5 is a representational view showing E-mail applications and E-mail files stored in fixed disk 15 in a case where computer system 10 is serving as an E-mail server. As shown in FIG. 5, the E-mail applications stored in fixed disk 15 include E-mail server 35. E-mail server 35 manages E-mail files stored in fixed disk 15, including unread mail 36, read mail 37, and sent mail 38. Unread mail 36 includes E-mail messages stored in a shared directory before those messages have been read by their intended recipients, as described above with respect to FIG. 1. Read mail 37 includes E-mail messages that have been read by users and that users have decided to retain for later reference. Sent mail 38 includes E-mail messages that have been sent by a user using E-mail editor 31 on an E-mail client and that the user also has retained for later reference. Preferably included with the E-mail files are logs 39 that track E-mail usage. Of course, other arrangements of E-mail files are possible.

Figure 6:
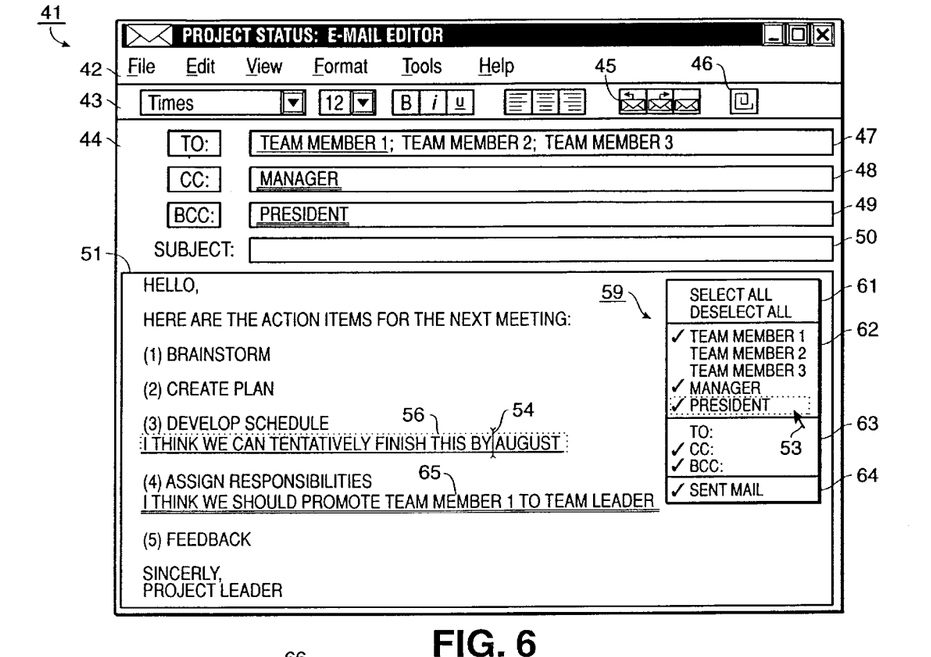
FIG. 6 is a representational view of a graphical user interface for an E-mail editor according to the preferred embodiment of the invention.

FIG. 6 is a representational view of a graphical user interface for E-mail editor 31 according to the preferred embodiment of the invention. This graphical user interface comprises E-mail editor window 41. Included in E-mail editor window 41 are pull-down menu bar 42, tool bar 43, and message area 44.

As shown in FIG. 6, pull-down menu bar 42 includes pull-down menus for file commands, edit commands, view commands, format commands, tool commands, and help commands. Other pull-down menus also can be provided in pull-down menu bar 42.

Tool bar 43 includes tools for determining font type, font size, and format information for a message generated using E-mail editor window 41. Tool bar 43 also includes send buttons 45 for sending, forwarding, and replying to messages, and attachment button 46 for attaching files to a message.

Message area 44 includes "To:" list box 47, "cc:" list box 48, "bcc:" list box 49, "Subject:" list box 50, and message text area 51. "To:" list box 47 is used for designating intended recipients of a message entered into message text area 51. "Cc:" list box 48 is used for designating or courtesy copy recipients of the message. "Bcc:" list box 49 is used for designating blind-courtesy-copy recipients of the message. Blind-courtesy-copy recipients are recipients who are intended to receive the message without other recipients being aware of their receipt. "Subject:" list box 50 is used for entering an optional subject title for the message. Message area 51 is used for entering the text body of the message. Icons representing attachments also can appear in message text area 51.

In order to generate a message, a user manipulates items in E-mail editor window 41 using cursor 53 controlled with pointing device 14. The user identifies intended recipients of the message in list boxes 47 through 49, enters a subject for the message in "Subject:" list box 50, and enters text for the body of the message in message text area 51. Attachments can be designated using a window called up with attachment button 46.

As the message is being entered, the user can "focus" on a part of the message by pointing to that part of the message with cursor 53 and then clicking on a left button of pointing device 14. When the user clicks the left button of pointing device 14, focus indicator 54 appears where cursor 53 is positioned.

If the user keeps the left button depressed and moves cursor 53, focus indicator 54 follows the cursor, and any text through which focus indicator 54 passes is highlighted. This highlighted text is "selected". In FIG. 6, text line 56 of message text area 51 has been so selected, as indicated by the broken line surrounding text line 56. On an actual display, the selected text preferably is highlighted, as for example by being displayed in a rectangle with inverse colors as compared to unselected text.

Selected text is affected by various commands entered into E-mail editor window 41. For example, if the user selects a portion of text in message text area 51 and then activates one of the format tools in tool bar 43, the formatting command (e.g., bold or underline) is applied to the selected text.

In conventional systems, a user can utilize an E-mail editor to generate and format a message in a similar fashion as described above. The user can designate "To:" category recipients, "cc:" category go recipients, and "bcc:" category recipients. However, in these conventional systems, each recipient receives identical message text and attachments. Thus, if the user desires to direct special comments to some but not to others of the recipients, the user must create a separate message. As some of the contents of the separate message often will be the same as in the first message, this process is inefficient.

The present invention addresses the foregoing deficiencies of conventional systems by allowing a user to author an E-mail message in which selected portions of text or attachments are sent only to certain recipients. In order to author such a message, the user first composes all or part of a message. In the absence of contrary instructions entered by the author (i.e., as a default procedure), the entire message will be sent to all recipients designated in list boxes 47 through 49. Then, the user selects a portion of the message, such as text line 56, and activates a recipient selection process, for example with key strokes or by clicking the right button of pointing device 14. In response to this activation, a list of intended recipients is displayed, and the user can select or deselect recipients for the selected part of the message using the list. By selecting less than all of the listed recipients for portions of the message, the user easily can customize the message for different recipients.

In the preferred embodiment, the list of recipients comprises a pop-up window such as pop-up window 59 shown in FIG. 6. Pop-up window 59 includes several sections that allow different methods for selecting and/or deselecting intended recipients. Select/deselect-all section 61 allows the user to select or deselect all of the recipients at once. Individual selection section 62 allows the user to select or deselect recipients individually. As shown in FIG. 6, "Team Member 1", "Manager", and "President" have been selected as recipients for selected text line 56. This designation of recipients is indicated by check marks next to the recipients in individual selection section 62.

Also included in pop-up window 59 are category selection section 63 and sent mail selection section 64. Category selection section 63 allows the user to select intended recipients grouped by the recipient categories. Sent mail section 64 is provided to allow the user to designate portions of the message that should be included in the user's retained store of sent mail. For example, if the only recipient of a selected part of the message is "sent mail", that portion of the message could be used for private notes that the user wants to retain concerning the message, but that the user does not want to be sent to any recipient.

In order to select or deselect recipients, the user preferably points to a recipient using cursor 53, and then selects or deselects that recipient by clicking on the left button of pointing device 14. In the preferred embodiment, changes in any one of the sections are reflected in the other sections. For example, if the "To:" category in category selection section 63 is selected, the corresponding individual recipients in individual selection section 62 have check marks automatically displayed next to them, indicating that they have been selected. Optionally, if some but not all of the recipients for a category have been designated as recipients of the selected part of the message, a special mark (for example, a gray, rather than black, check mark) can be displayed next to that category.

In addition, visual cues in message text area 51 and list boxes 47 through 49 preferably are provided to indicate which portions of the message are designated for which recipient. For example, text line 65 has been designated with a double underline, and recipients "Manager" and "President" in list boxes 48 and 49, respectively, also have been highlighted with a double underline. This highlighting indicates that text line 65 is intended only for recipients "Manager" and "President".

In the preferred embodiment, highlighting such as by color-coding also is used to indicate portions of the message intended for different categories of recipients. For example, black text in message text area 51 is intended for all recipients, blue text is intended for "To:" recipients, green text is intended for "cc:" recipients, and red text is intended for "bcc:" recipients. In addition, recipients for text that is in focus can be color-coded or otherwise highlighted in list boxes 47 through 49.

Other types of highlighting and other color schemes can be used to provide the foregoing visual cues, and are included within the scope of the invention. These other types of highlighting include, for example, different fonts, different text styles (e.g., bold, shadow, etc.), flashing text, etc.

After the user has designated the recipients for the various portions of the message, the user can continue adding text and attachments, redesignating recipients, etc., until the user is satisfied.

In an alternative embodiment, recipients are associated with text by first selecting intended recipients. This selection can be made in a similar fashion as described above. Then, subsequently-entered text is automatically designated as intended for the selected recipients. If the user subsequently selects a different recipient or recipients, text entered following that designation is associated with those recipients. This process is repeated until the message is complete. In addition, the user can select already-entered text and modify the recipients of that text, as described above.

At some point in the process of authoring the message, the user may desire to see how the message will appear as received by each recipient. Optionally, E-mail editor 31 is implemented so as to allow a user to view the message in this manner, as explained with reference to FIG. 7 below.

Figure 7:
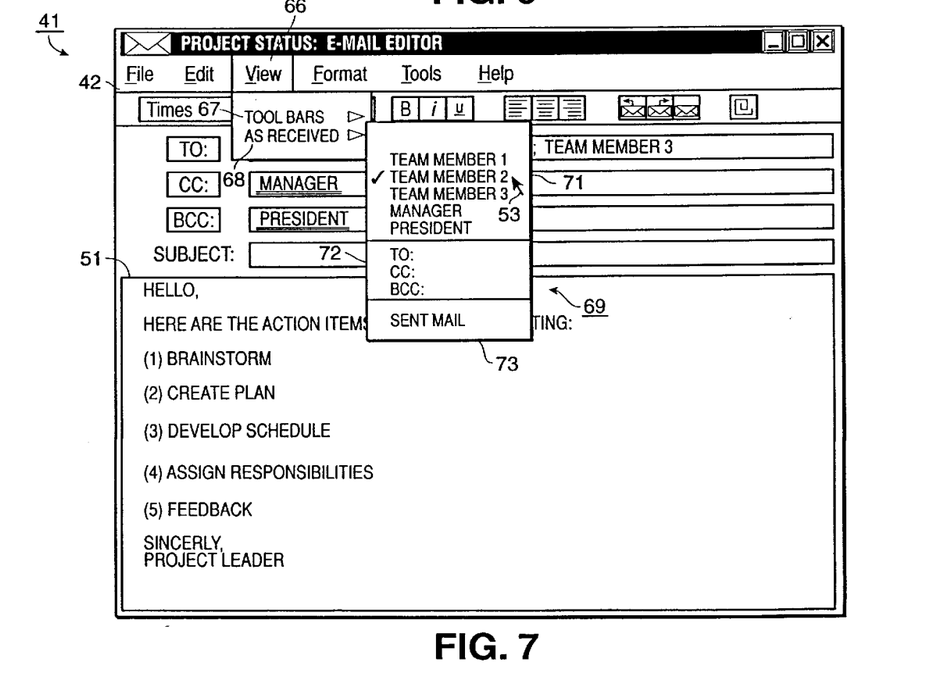
FIG. 7 is a view for illustrating how a user can manipulate the interface of FIG. 6 in order to view a message so as to see how the message will appear as received by each recipient.

In the preferred embodiment illustrated in FIG. 7, in order to view a message as it will be received by a particular recipient, the user clicks on view pull-down menu 66 from pull-down menu bar 42 of E-mail editor window 41. Preferably, view pulldown menu 66 includes at least tool bars line 67 and as-received line 68. Other lines can be provided in view pull-down menu 66. Tool bars line 67 provides access to conventional tool bars. As-received line 68 provides access to list 69 of intended recipients.

Shown in list 69 are individual selection section 71, category selection section 72, and sent-mail selection section 73. Individual selection section 71 includes all recipients named in list boxes 47 through 49. Category selection section 72 includes lines for the "To:" category, the "cc:" category, and the "bcc:" category. Sent-mail selection section 73 includes a line for selecting sent mail. In order to view the message as received by one of these recipients, the user clicks on the recipient using cursor 53. For example, as shown in FIG. 7, Team Member 2 has been clicked on, as indicated by the check mark next to the line for Team Member 2 in individual selection section 71. As a result, message text area 51 displays the message as it will be received by Team Member 2. In particular, in the case that the message is the one shown in FIG. 6, text line 56 and text line 65 are omitted from the message, because Team Member 2 is not a selected recipient for these two lines of the message.

Attachments can be added to the message using attachment button 46 in tool bar 43. The recipients for an attachment can be designated in a similar manner as for portions of text. Once the user is satisfied with the contents of the message, including text and any attachments, and with the designation of recipients for portions of the text and the attachments, the user can utilize send buttons 45 to send the message to the recipients.

A recipient can read the message using a conventional E-mail reader. However, in the preferred embodiment, the E-mail reader allows a recipient to identify which parts of the message he or she received that were not sent to all other recipients.

Figure 8:
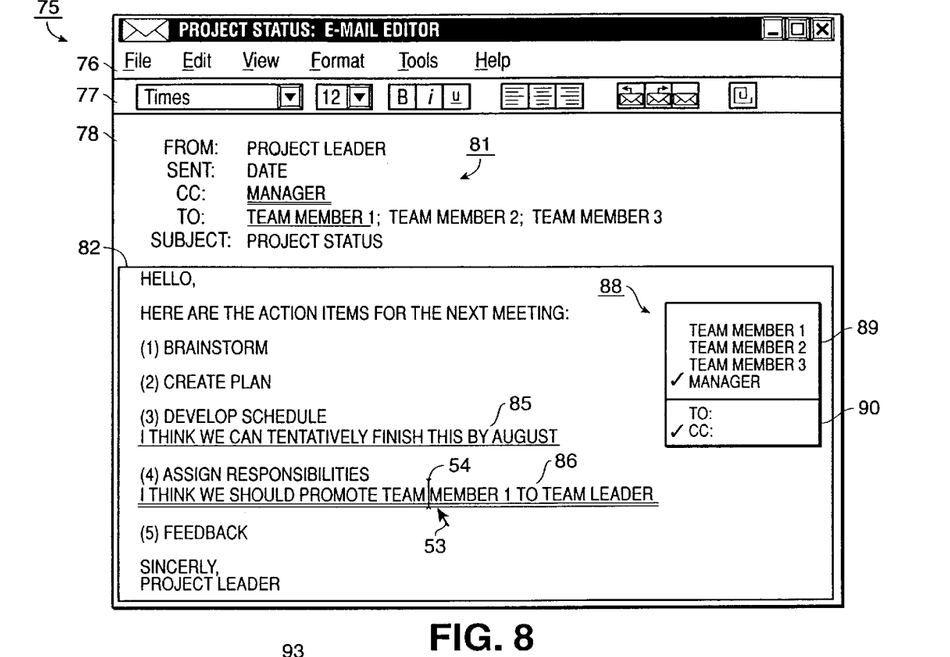
FIG. 8 is a representational view of a graphical user interface for an E-mail reader according to the preferred embodiment of the invention.

FIG. 8 is a representational view of a graphical user interface for E-mail reader 32 according to the preferred embodiment of the invention. This graphical user interface comprises E-mail reader window 75. Included in E-mail reader window 75 are pull-down menu bar 76, tool bar 77, and message area 78.

Message area 78 includes message information area 81 and message text area 82. As shown in FIG. 8, message information area 81 indicates that the message is sent from "Project Leader" on "Date" to "Team Member 1", "Team Member 2", "Team Member 3", and "Manager". The "cc:"

recipient line is placed above the "To:" recipient line because, in this example, the E-mail reader is being used by "Manager" (a "cc:" recipient). Message information area 81 also indicates that the subject of the message is "Project Status".

Message text area 82 includes message text corresponding to the message depicted in FIG. 6, including portions of text intended for recipient "Manager". If a message includes any attachments, an icon linking the message to the attachment (s) preferably is shown in message text area 82. Text lines 85 and 86 are highlighted, in the illustrated embodiment by underlining, to indicate that these text lines were not received by all the recipients listed in message information area 81. It should be noted that text designated for recipient "President" in FIG. 6 is not shown in FIG. 8, because this text was not intended for receipt by "Manager".

If the user, in this case "Manager", desires to see who else received the highlighted text, "Manager" places the text in focus and then calls up a list of the recipients for that text. For example, the user can position cursor 53 on the highlighted text and can left-click with pointing device 14 to call up focus indicator 54. The user can then right-click with pointing device 14 to call up a list of recipients. In the preferred embodiment, the list is in a pop-up window such as pop-window 88. The pop-up window includes individual section 89 and category section 90. A check mark appears beside the recipients and the categories who have received the text in focus. Again, gray check marks (or other special indicators) optionally can be used to indicate that part but not all of a category has been designated as an intended recipient.

Alternatively, the pop-up window can contain only those recipients who receive the text that is in focus. For example, in FIG. 8, such a pop-up window would include only "Manager".

The recipient of the message also may desire to view the message as it is received by other recipients (i.e., those who received less of the whole message than did the recipient in question).

Of course, when the message is viewed in the as-received mode, only those parts of the message received by both the user and the identified recipient(s) are displayed. For example, if Manager viewed the message as received by President, Manager would not see text designated for President but not for Manager. Instead, Manager would see only those parts of the message that were intended for both Manager and President.

Figure 9:
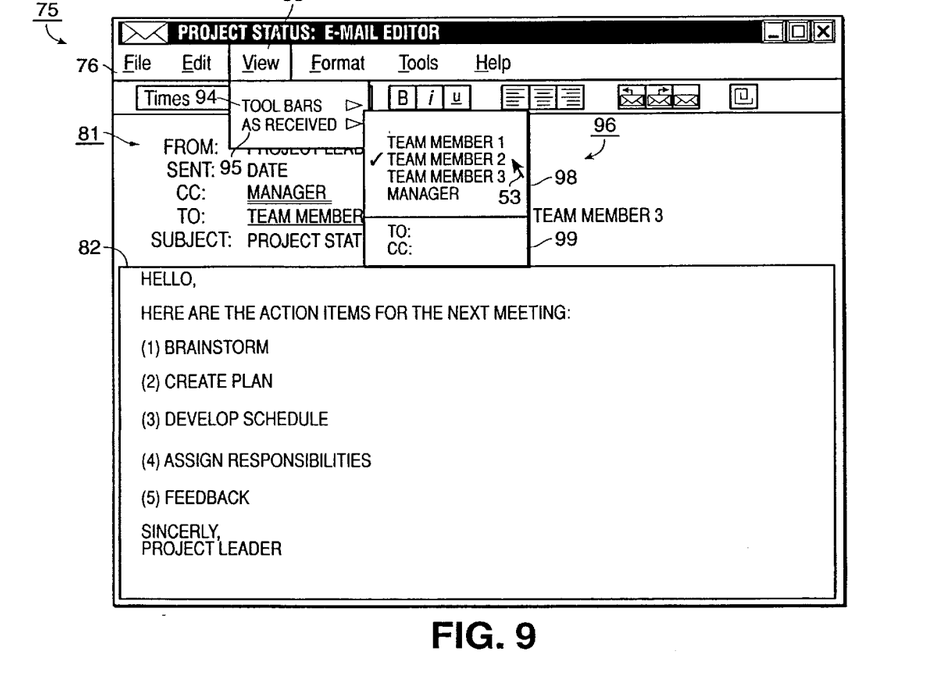
FIG. 9 is a representational view illustrating how the interface of FIG. 8 can be manipulated so as to provide a recipient of a message with a view of the message as it is received by other recipients.

FIG. 9 is a representational view illustrating how the preferred embodiment of E-mail reader window 75 can be manipulated to display a message as received by a particular recipient or category of recipients. The operation of E-mail reader window 75 in this respect is similar to the operation of E-mail editor window 41 shown in FIG. 7. Briefly, the user accesses view pull-down menu 93 in pull-menu bar 76. View pull-down menu 93 preferably includes at least tool bars line 94 and as-received line 95. Other lines can be provided in view pull-down menu 93. Tool bars line 94 provides access to conventional tool bars. As-received line 93 provides access to list 96 of the intended recipients.

Shown in list 96 are individual section 98 and category section 99. In order to view the message as received by one of these recipients, the user clicks on the recipient using cursor 53.

In operation, to create a message with recipient-specific content, a user composes the message, identifies one or more recipients to whom at least one portion of the message will be sent, and for each recipient associates at least one portion of the message such that at least one recipient does not receive all portions of the message. Preferably, the user can view a list of recipients of each portion and can view the message as it will be received by a particular recipient or recipients. Once the user is satisfied with the message, the author instructs the message to be sent, and the appropriate portions are sent to the appropriate respective recipients. The recipient can view the received message with portions highlighted such that the recipient of a message (or at least part thereof) is provided with visual cues as to whether other recipients have received the highlighted portions. The recipient can view portions of the message that are actually sent to each recipient, for example in an as-received mode. In addition, the recipient can view a list of recipients for each portion.

Figure 10:
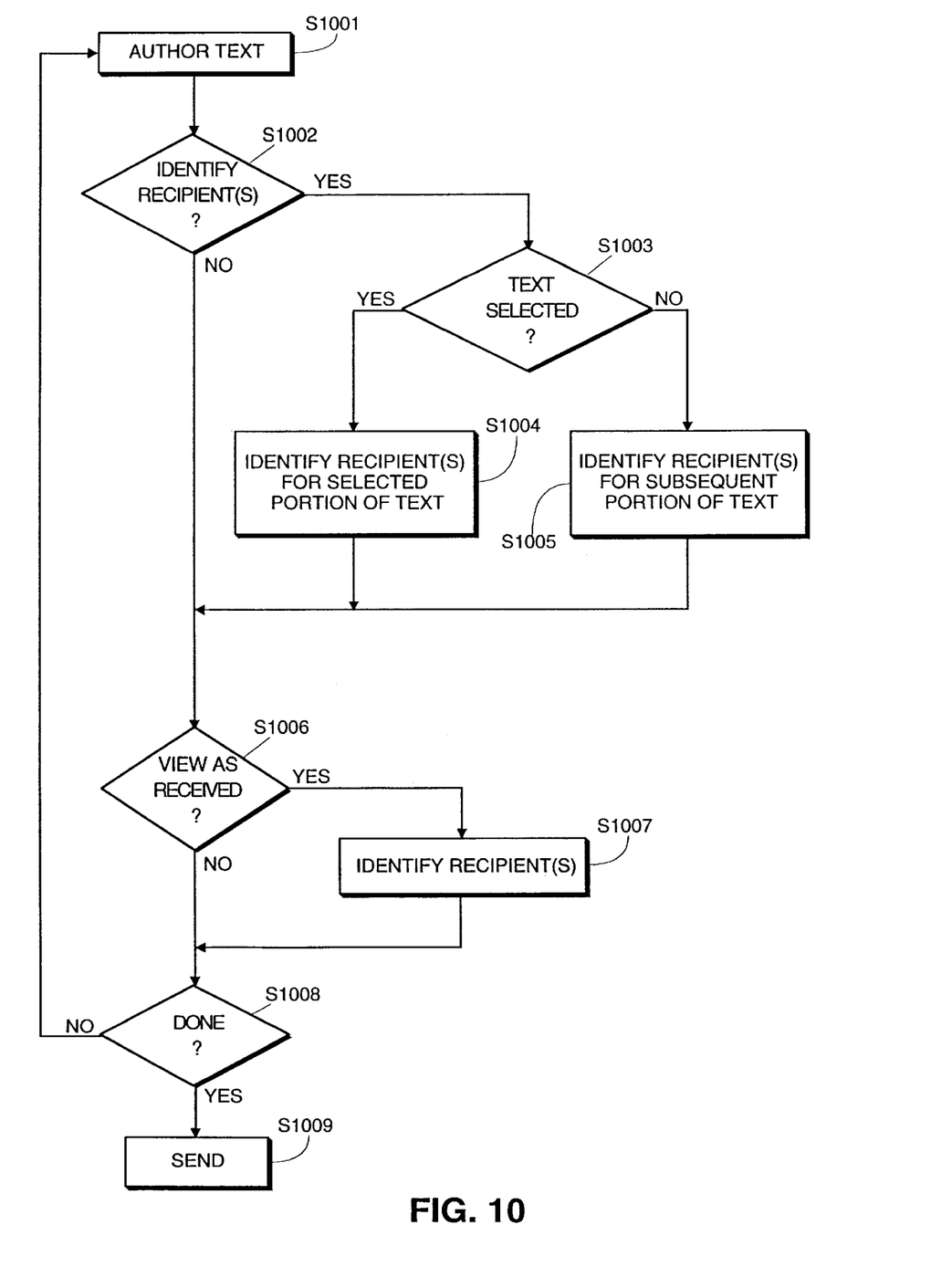
FIG. 10 is a flowchart for explaining the operation of the preferred embodiment of the invention in authoring computerized messages.

FIG. 10 is a flowchart for explaining the foregoing operation of the preferred embodiment of the invention in creating computerized messages. In step S1001, portions of a message including text and/or attachments are authored. By default, all recipients are designated to receive all portions of the message. If it is desired to identify a subset of the recipients as intended recipients for a portion of the message in step S1002, flow proceeds to step S1003. Otherwise, flow proceeds to step S1006.

In step S1003, it is determined if a portion of the message has been selected. If so, recipients for that portion are identified in step S1004. For example, a user could right-click with pointing device 14, calling up pop-up window 59. The user could then select or deselect individual recipients, categories of recipients, or sent mail, as desired. Flow then proceeds to step S1006.

On the other hand, if text has not been selected, flow instead proceeds to step S1005, and recipients for subsequently entered portions are identified. For example, a user could call up pop-up window 59 and designate one or more recipients. Then, subsequently-entered text and attachments would be designated as intended for receipt by only those recipients. Flow then proceeds to step S1006.

In step S1006, it is determined if the message should be viewed as received by particular recipients. If the message should be so viewed, flow proceeds to step S1007, where those recipients are identified. For example, the recipients can be identified using view pull-down menu 66. After the appropriate recipients are identified, the message can be viewed as it will be received by those recipients. In any case, flow then proceeds to step S1008.

In step S1008, if more text or another attachment is to be added to the message, flow returns to step S1001. Otherwise, if the message is complete, flow proceeds to step S1009, where the message is sent.

Figure 11:
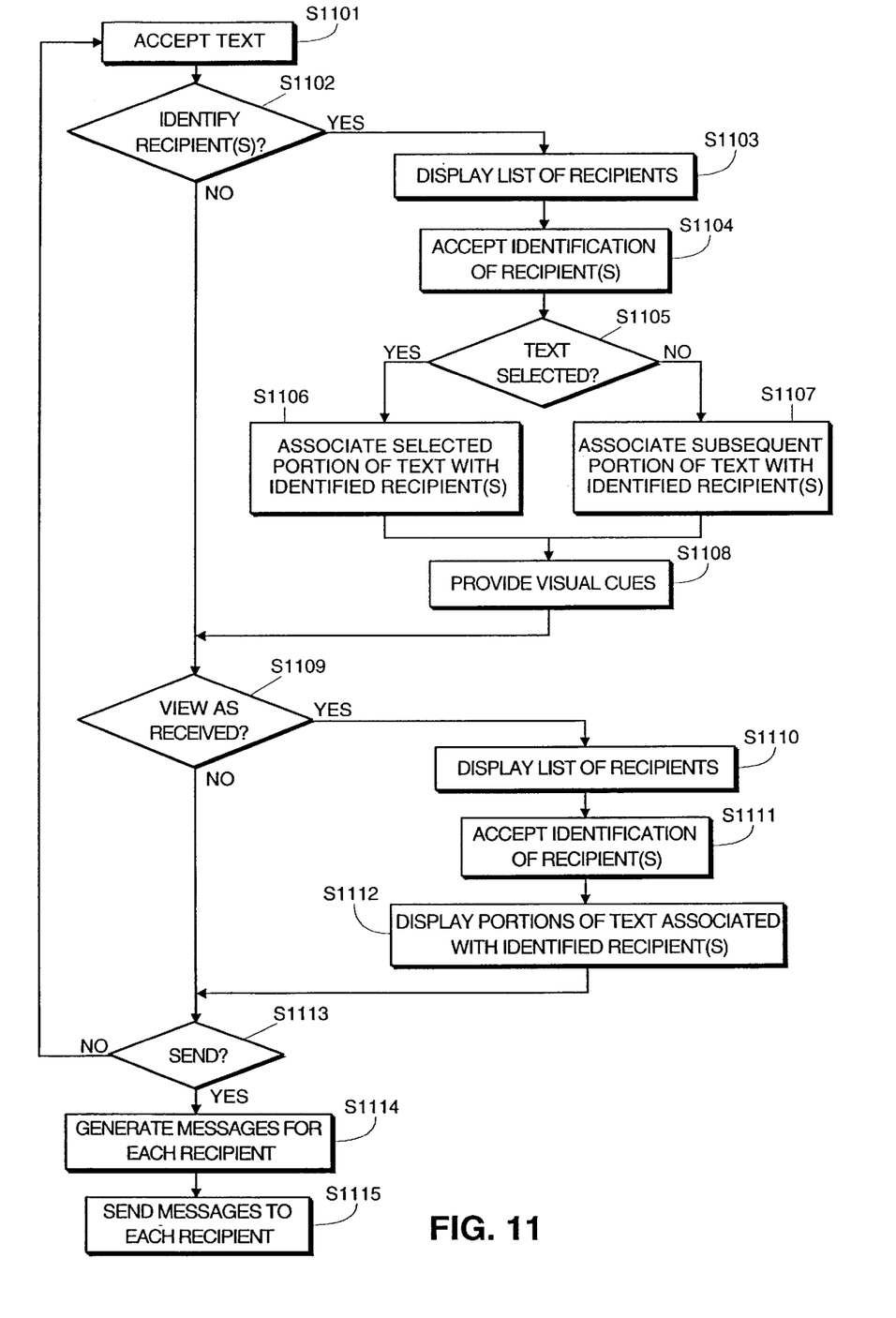
FIG. 11 is a flowchart for describing the operation of an E-mail editor in carrying out the authoring of computerized messages according to the preferred embodiment of the invention.

FIG. 11 is a flowchart for describing the operation of E-mail editor 31 in carrying out the foregoing authoring operation. In step S1101, E-mail editor 31 accepts portions of a message (i.e., text and/or attachments) entered by a user. Step S1102 determines if a user has given a command that recipients for text should be identified. If so, flow proceeds to step S1103, where a list of recipients such as pop-up window 59 is displayed. In step S1104, identification of recipients from the list is accepted.

In step S1105, a determination is made as to whether one of the portions of the message has been selected, for example as shown by highlighting of text line 56 in FIG. 6. If one of the portions of the message has been selected, flow proceeds to step S1106, where the selected portion of the message is associated with the recipients identified in step S1104. Otherwise, flow proceeds to step S1107, where E-mail editor 31 determines that subsequently entered portions of the message will be associated with the recipients identified in step S1104.

In either case, flow then proceeds to step S1108, where visual cues are provided indicating the associations between portions of the message and recipients. These visual cues can be in the form of underlining, color schemes, or other forms of highlighting.

If no command has been given to identify recipients, or after visual cues have been provided, flow proceeds to step S1109. In step S1109, it is determined if a command has been given to view the message as it will be received by particular recipients. Such a command can be given using as-received line 68 of view pull-down menu 66. If a command has been given to view the message as received, flow proceeds to step S1110. Otherwise, flow proceeds to step S1113.

In step S1110, a list of recipients is displayed, such as list 69. Identification of recipients is accepted in step S111, and portions of text associated with the identified recipients are displayed in step S1112. Thereafter, flow proceeds to step S1113.

In step S1113, it is determined if a command has been given to send the message. If not, flow returns to step S1101, where more text and attachments can be entered into the message. If a command has been given to send the message, flow proceeds to step S1114.

In step S1114, E-mail editor 31 generates A separate messages corresponding to each subset of identified recipients. For example, for the message shown in FIG. 6, separate messages are made for the following groups of recipients: (1) "Team Member 2" and "Team Member 3"; (2) "Team Member 1", "Manager" and "President"; and (3) "Manager" and "President". Each separate message contains only those input portions associated with the corresponding identified subset of recipients.

Figure 12:
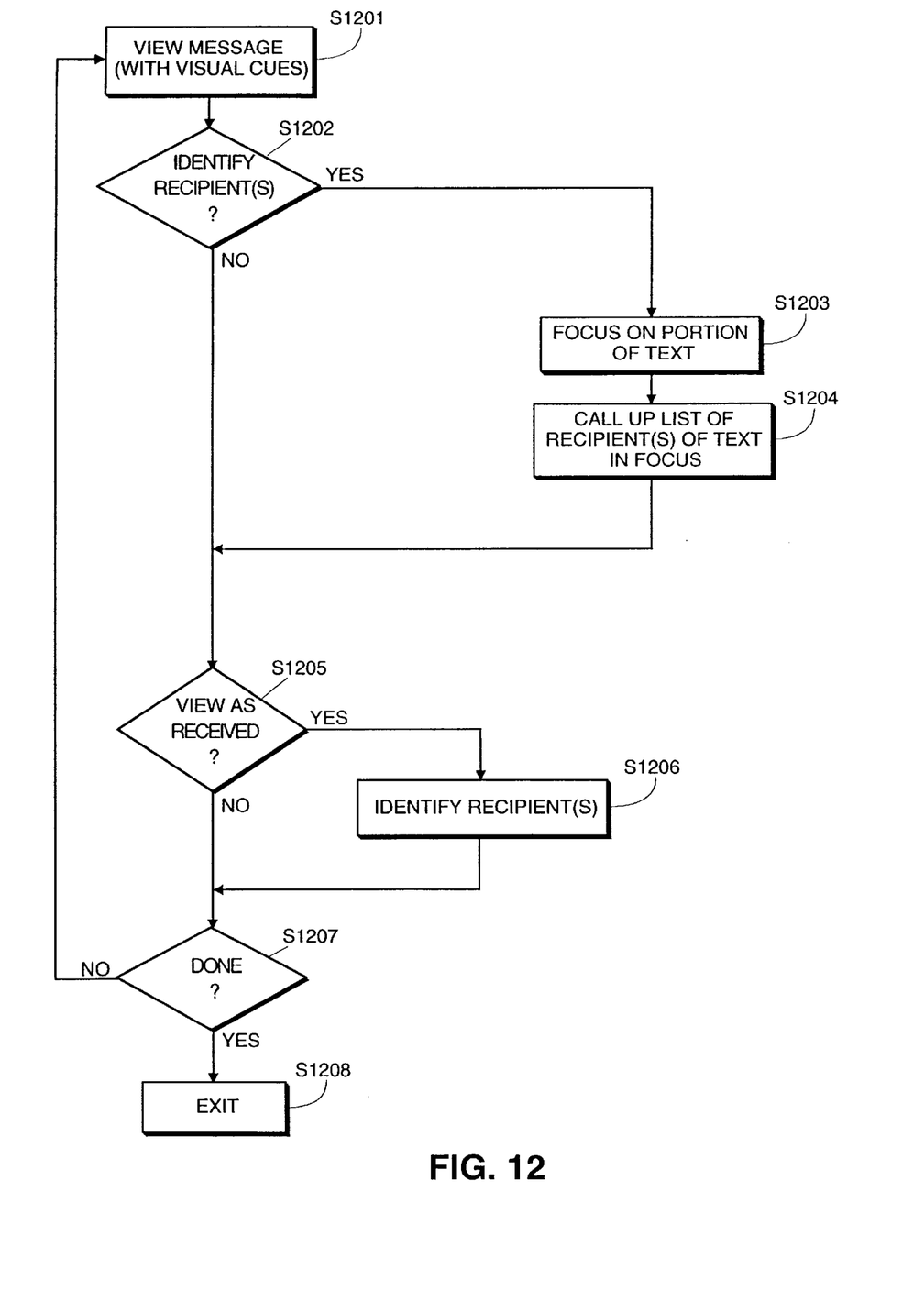
FIG. 12 is a flowchart for describing viewing of a message according to the preferred embodiment of the invention.

FIG. 12 is a flowchart for describing viewing of a message according to the preferred embodiment of the invention. In step S1201, a message is viewed, preferably including visual cues indicating which portions of the message are intended for less than all of the recipients. If it is desired in step S1202 to see which recipients will receive a particular portion of the text, flow proceeds to step S1203. Otherwise, flow proceeds to step S1205.

In step S1203, a portion of text is placed in focus. Then, in step S1204, a list of recipients of the text in focus is called up. Next, flow proceeds to step S1205.

In step S1205, it is determined if the message should be viewed as received by one or more particular recipient(s). If the message should be so viewed, a recipient or category of recipients is identified in step S1206. Then, the message can be viewed as received by the identified recipient(s).

In any case, flow proceeds to step S1207, where it is determined if the viewing process is complete. If not, flow returns to step S1201. Otherwise, flow proceeds to step S1208, where the viewing process exits.

Figure 13:
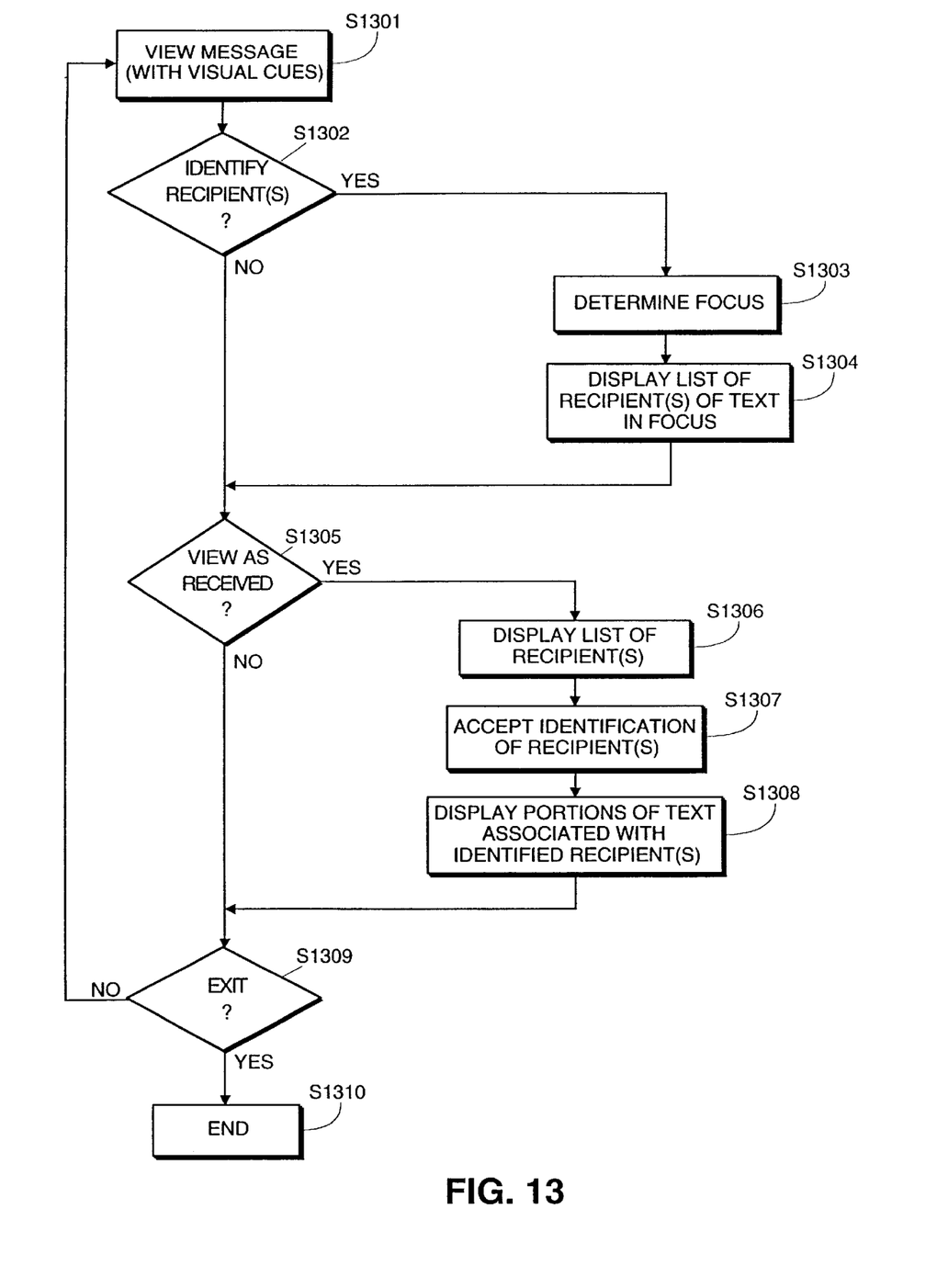
FIG. 13 is a flowchart for describing the operation of an E-mail reader in performing the viewing of computerized messages according to the preferred embodiment of the invention.

FIG. 13 is a flowchart for describing the operation of E-mail reader 32 in performing the viewing operation described above. In step S1301, E-mail reader 32 displays text and icons for attachments for a message, preferably including visual cues indicating portions of the message that were received by fewer than all recipients. In step S1302, it is determined whether a command has been given to identify recipients of a particular portion of the message. In that case, flow proceeds to step S1303, where E-mail reader 32 determines where the user's focus is in the message. Then, a list of recipients corresponding to the text in focus is displayed in step S1304. The list preferably is displayed in a pop-up window such as pop-up window 88. The list can include all possible recipients, with those recipients who receive the in-focus portion of the message being designated with, for example, check marks. Alternatively, the list can include only those recipients who receive the in focus portion.

In step S1305, which follows steps S1302 and S1304, it is determined whether a command has been given to view the message as received by one or more particular recipient (s). If so, flow proceeds to step S1306, where a list of recipients and categories of recipients is displayed. In step S1307, identification of recipient(s) is accepted, and in step S1308, portions of text associated with the identified recipient(s) are displayed.

In any case, flow proceeds to step S1309, where it is determined if a command to exit E-mail reader 32 has been given. If such a command has not been given, flow returns to step S1301. Otherwise, flow proceeds to step S1310, where E-mail reader 32 exits.

The invention has been described with respect to a particular illustrative embodiment. It is to be understood that the invention is not limited to the details of the above-described embodiment and that various changes, and that modifications may be made by those of ordinary skill in the art without departing from the spirit and scope of the invention.

What is claimed is:

1. A method for creating a computerized message that contains recipient-specific content, comprising the steps of:

an author of the message composing plural portions of a message;

identifying one or more recipients to which at least one portion of the message will be sent; and associating, with each recipient, at least one portion of the message such that at least one recipient does not receive all portions of the message.

2. A method according to claim 1, further comprising the step of sending the computerized message with a portion associated in said associating step being sent to a respective set of one or more recipients with whom that portion has been associated.

3. A method according to claim 2, further comprising the step of one recipient, among plural recipients, viewing a received message with at least a portion highlighted such that that one recipient is provided with visual cues as to whether other recipients have received the highlighted portion.

4. A method according to claim 1, further comprising the step of viewing portions of the message that are to be sent to respective sets of one or more recipients.

5. A method according to claim 4, wherein said viewing step comprises viewing those portions in an as-received mode.

6. A method according to claim 1, further comprising the step of viewing a list of recipients for each portion.

7. A method according to claim 1, wherein said associating step further comprises the steps of selecting portions of the message and identifying one or more recipients for at least one of the selected portions.

8. A method according to claim 7, wherein said identifying step comprises making a selection from a pop-up list.

9. A method according to claim 7, wherein said identifying step comprises making a deselection from a pop-up list.

10. A method according to claim 1, further comprising the step of displaying the computerized message to the author, with visual cues of which portions are to be sent to which recipient.

11. A method according to claim 10, wherein visual cues include color-coding for a "to:" list.

12. A method according to claim 10, wherein visual cues include color-coding for a "cc:" list.

13. A method according to claim 10, wherein visual cues include color-coding for a "bcc:" list.

14. An apparatus for creating a computerized message that contains recipient-specific content, comprising:

a memory including a region for storing executable process steps; and a processor for executing the executable process steps, wherein the executable process steps include steps of: (a) accepting composition of plural portions of a message; (b) accepting identification of one or more recipients to which at least one portion of the message will be sent; and (c) accepting an association, with each recipient, of at least one portion of the message such that at least one recipient does not receive all portions of the message.

15. An apparatus according to claim 14, wherein the executable process steps further include the step of sending the computerized message with portion associated in said associating step being sent to a respective set of one or more recipients with whom that portion has been associated in said associating step.

16. An apparatus according to claim 15, wherein the computer-executable process steps further include the step of one recipient, among plural recipients, viewing a received message with at least a portion highlighted such that that one recipient is provided with visual cues as to whether other recipients have received the highlighted portion.

17. An apparatus according to claim 14, wherein the computer-executable process steps further include the step of providing a view of portions of the message that are to be sent to respective sets of one or more recipients.

18. An apparatus according to claim 17, wherein said step of providing a view comprises providing a view of those portions in an as-received mode.

19. An apparatus according to claim 14, wherein the computer-executable process steps further include the step of providing a view of a list of recipients for each portion.

20. An apparatus according to claim 14, wherein said step of accepting association comprises the steps of accepting selection of portions of the message and accepting identification of one or more recipients for at least one of the selected portions.

21. An apparatus according to claim 20, wherein said identification comprises a selection from a pop-up list.

22. An apparatus according to claim 20, wherein said identification comprises a deselection from a pop-up list.

23. An apparatus according to claim 14, wherein the computer-executable process steps further include the step of providing a display of the computerized message to the sender with visual cues of which portions are to be sent to which recipient.

24. An apparatus according to claim 23, wherein visual cues include color-coding for a "to:" list.

25. An apparatus according to claim 23, wherein visual cues include color-coding for a "cc:" list.

26. An apparatus according to claim 23, wherein visual cues include color-coding for a "bcc:" list.

27. Computer-executable process steps stored on a computer-readable medium, the computer-executable process steps for creating a computerized message that contains recipient-specific content, said computer-executable process steps comprising:

code to accept an author's composition of plural portions of a message;

code to accept identification of one or more recipients to which at least one portion of the message will be sent; and code to associate, with each recipient, at least one portion of the message such that at least one recipient does not receive all portions of the message.

28. Computer-executable process steps according to claim 27, further comprising code to send the computerized message with a portion associated by said code to associate being sent to a respective set of one or more recipients with whom that portion has been associated.

29. Computer-executable process steps according to claim 28, further comprising code to provide a recipient with a view of a received message with at least a portion highlighted such that that one recipient is provided with visual cues as to whether other recipients have received the highlighted portion.

30. Computer-executable process steps according to claim 27, further comprising code to provide a view of portions of the message that are sent to respective sets of one or more recipients.

31. Computer-executable process steps according to claim 30, wherein said code to provide a view of portions of the message that are sent to respective sets of one or more recipients comprises code to provide a viewing in an as-received mode.

32. Computer-executable process steps according to claim 27, further comprising code to provide a view of a list of recipients for each portion.

33. Computer-executable process steps according to claim 27, wherein said code to associate comprises code to accept selection of portions of the message and to accept identification of recipients for selected portions.

34. Computer-executable process steps according to claim 33, wherein said identification comprises a selection from a pop-up list.

35. Computer-executable process steps according to claim 33, wherein said identification comprises a deselection from a pop-up list.

36. Computer-executable process steps according to claim 27, further comprising code to provide a display of the computerized message to the author with visual cues of which portions are to be sent to which recipient.

37. Computer-executable process steps according to claim 36, wherein visual cues are color-coded for a "to:" list.

38. Computer-executable process steps according to claim 36, wherein visual cues are color-coded for a "cc:" list.

39. Computer-executable process steps according to claim 36, wherein visual cues are color-coded for a "bcc:" list.

40. A computer-readable medium according to claim 36, wherein visual cues are color-coded for a "to:" list.

41. A computer-readable medium according to claim 36, wherein visual cues are color-coded for a "cc:" list.

42. A computer-readable medium according to claim 36, wherein visual cues are color-coded for a "bcc:" list.

43. A computer-readable medium which stores computer-executable process steps, the computer-executable process steps for creating a computerized message that contains recipient-specific content, the computer-executable process steps comprising:

an authoring step to accept an author's composition of plural portions of a message;

an identifying step to accept identification of one or more recipients to which at least one portion of the message will be sent; and an associating step to associate, with each recipient, at least one portion of the message such that at least one recipient does not receive all portions of the message.

44. A computer-readable medium according to claim 40, wherein the computer-executable process steps further comprise a sending step to send the computerized message with a portion associated by said step to associate being sent to a respective set of one or more recipients with whom the portion has been associated.

45. A computer-readable medium according to claim 41, wherein the computer-executable process steps further comprise a viewing step to provide a recipient with a view of a received message with at least a portion highlighted such that that one recipient is provided with visual cues as to whether other recipients have received the highlighted portion.

46. A computer-readable medium according to claim 40, wherein the computer-executable process steps further comprise a viewing step to provide a view of portions of the message that are sent to respective sets of one or more recipients.

47. A computer-readable medium according to claim 46, wherein the viewing step comprises providing a view in an as-received mode.

48. A computer-readable medium according to claim 40, wherein the computer-executable process steps further comprise a viewing step to provide a view of a list of recipients for each portion.

49. A computer-readable medium according to claim 40, wherein said associating step comprises accepting selection of portions of the message and accepting identification of recipients for selected portions.

50. A computer-readable medium according to claim 49, wherein said identification comprises a selection from a pop-up list.

51. A computer-readable medium according to claim 49, wherein said identification comprises a deselection from a pop-up list.

52. A computer-readable medium according to claim 40, wherein the computer-executable process steps further comprise a displaying step to provide a display of the computerized message to the author with visual cues of which portions are to be sent to which recipient.

* * * * *

UNITED STATES PATENT AND TRADEMARK OFFICE
CERTIFICATE OF CORRECTION

PATENT NO.    : 6,192,396 B1
DATED         : February 20, 2001
INVENTOR(S)   : Timothy L. Kohler It is certified that error appears in the above-identified patent and that said Letters Patent is hereby corrected as shown below:

Column 3,
Line 57, "Etherneto" should read -- Ethernet® --.

Column 6,
Line 3, "or" should be deleted.
Line 45, "go" should be deleted.

Column 11,
Line 20, "S111" should read -- S1111 --.
Line 30, "A" should be deleted.

Column 15,
Line 9, "claim 40," should read -- claim 43, --.
Line 15, "claim 41," shoud read -- claim 44, --.
Line 22, "claim 40," should read -- claim 43, --.

Column 16,
Line 4, "claim 40," should read -- claim 43, --.
Line 8, "claim 40," should read -- claim 43, --.
Line 20, "claim 40," should read -- claim 43, --.

Signed and Sealed this

Twenty-sixth Day of March, 2002

*Attest:*

JAMES E. ROGAN
*Attesting Officer*                    *Director of the United States Patent and Trademark Office*